(12) United States Patent
Bridgewater et al.

(10) Patent No.: US 7,512,158 B2
(45) Date of Patent: Mar. 31, 2009

(54) JITTER PREVENTION IN A DIGITAL COMMUNICATION NETWORK

(75) Inventors: Kevin Elliott Bridgewater, Indianapolis, IN (US); Terry Wayne Lockridge, Indianapolis, IN (US); Thomas Edward Horlander, Indianapolis, IN (US)

(73) Assignee: Thomson Licensing, Boulogne Billancourt (FR)

( * ) Notice: Subject to any disclaimer, the term of this patent is extended or adjusted under 35 U.S.C. 154(b) by 640 days.

(21) Appl. No.: 10/471,268

(22) PCT Filed: Mar. 8, 2002

(86) PCT No.: PCT/US02/07014

§ 371 (c)(1), (2), (4) Date: Sep. 9, 2003

(87) PCT Pub. No.: WO02/073850

PCT Pub. Date: Sep. 19, 2002

(65) Prior Publication Data

US 2004/0136367 A1     Jul. 15, 2004

(30) Foreign Application Priority Data

Mar. 21, 2001   (EP)  ............................ 01400737

(51) Int. Cl.
*H04J 3/06*     (2006.01)

(52) U.S. Cl. .................... 370/507; 375/359; 375/364

(58) Field of Classification Search ............ 370/392.62, 370/503, 507, 509, 516; 375/354, 359, 362, 375/364
See application file for complete search history.

(56) References Cited

U.S. PATENT DOCUMENTS

| 4,114,141 | A | | 9/1978 | Travis ........................ 340/151 |
| 4,293,846 | A | * | 10/1981 | Allison .................. 340/825.21 |
| 4,908,600 | A | * | 3/1990 | Martinez ............... 340/538.11 |
| 5,657,313 | A | * | 8/1997 | Takahashi et al. ........... 370/491 |
| 6,130,896 | A | * | 10/2000 | Lueker et al. ............... 370/469 |
| 6,308,280 | B1 | * | 10/2001 | Joseph et al. ............... 713/400 |
| 6,501,743 | B1 | * | 12/2002 | Kim et al. .................... 370/324 |
| 2001/0030978 | A1 | * | 10/2001 | Holloway et al. ........... 370/503 |

FOREIGN PATENT DOCUMENTS

| EP | 560237 | 9/1993 |
| GB | 2300789 | 11/1996 |

* cited by examiner

*Primary Examiner*—Hassan Kizou
*Assistant Examiner*—Bo Hui A Zhu
(74) *Attorney, Agent, or Firm*—Robert D. Shedd; Paul P. Kiel

(57) ABSTRACT

A server apparatus receives packetized data and transmits the packetized data over a network. The apparatus includes an input for receiving the packetized data from a signal source. An AC clock counter receives an AC power signal and generates a count value in dependence upon a frequency of the AC power signal. An output is coupled to the network and transmits the packetized data and the count value to a client device. A clock associated with the client device is controlled in dependence upon the count value.

17 Claims, 3 Drawing Sheets

JITTER PREVENTION IN A DIGITAL COMMUNICATION NETWORK

This application claims the benefit, under 35 U.S.C. § 365 of International Application PCT/US02/07014, filed Mar. 8, 2002, which was published in accordance with PCT Article 21(2) on Sep. 19, 2002 in English and which claims the benefit of U.S. patent application No. 60/274,821, filed Mar. 9, 2001.

The present invention generally relates to communications networks, and more particularly, to a digital home network ("DHN") using an alternating current ("AC") power source in the home to remove jitter from multimedia data packets.

Recent advances in digital communications technology have increased the viability of DHNs, which can allow various devices in a home to communicate with each other. In particular, the growing availability of broadband access has made it desirable to tie various devices in a home to a single gateway device that is coupled to provide centralized broadband access and distribution of multimedia data. In such a DHN, the gateway device accesses and buffers the multimedia data and distributes the data over the network as requested by various client devices coupled to the network.

When distributing such data over a DHN, certain problems may arise. For example, there are a number of problems associated with taking a live broadcast and distributing it over an asynchronous DHN since a client device receiving the data generally does not have any control over the incoming data stream. Accordingly, in order to ensure that the networked client device can decode and display all of the audio and/or video data delivered to it at the correct frame rate, and without repeated or dropped frames, data synchronization issues must be addressed.

One method for providing data synchronization in a broadcast network relies on delivering clock samples from a broadcast site to a gateway device with a fixed delay from the time of broadcast to the time of receipt. According to this method, a counter at the broadcast site is incremented by the broadcast site's reference clock to generate clock samples that are transmitted to the gateway device. At the instant the clock samples are received at the gateway device, a counter clocked by a voltage-controlled oscillator ("VCO") of the gateway device is sampled. The value of the counter at the gateway device is then compared with a count value represented by a clock sample provided from the broadcast site. If the difference between the counter values at the gateway device and the clock samples provided from the broadcast site varies over time, then a voltage applied to the VCO of the gateway device is adjusted to frequency lock the gateway device to the broadcast site's reference clock. While this method enables data synchronization between the broadcast site and the gateway device, it fails to provide data synchronization between the gateway device and networked client devices.

In a collision detect network such as an Ethernet network, the failure to provide data synchronization between the gateway device and networked client devices can be significant. In particular, in such networks, data packets from multiple client devices often collide on the network, thus causing variable and unpredictable delays in the reception of data packets by client devices. As a result, "jitter" may be introduced into the clocks of the client devices. Depending upon the magnitude of such jitter, serious side effects may result, such as video freezing, audio chirps and/or undesirable display color changes.

One way to address the jitter problem in a collision detect network involves using a buffer with overflow and underflow thresholds at the client device. In particular, by preventing the buffer level from crossing the overflow and underflow thresholds, the local clock of the client device can be controlled. While this technique may be useful in some situations, it is difficult to control and often requires video frames to be repeated or skipped.

Another way to address the jitter problem in a collision detect network involves using time stamps at the network layer. In particular, this technique uses different time stamps at different portions of a network in an attempt to provide synchronization. While this technique is also useful in some situations, it does not always work with certain routers or bridges since the transmission delay time of data packets through such devices is not always constant, thereby introducing jitter.

Accordingly, there is a need for a technique that overcomes the foregoing deficiencies and provides synchronization in a DHN. The present invention addresses these and other issues.

In accordance with an aspect of the present invention, a server apparatus receives packetized data and transmits the packetized data over a network. The apparatus includes an input for receiving the packetized data from a signal source. An AC clock counter receives an AC power signal and generates a count value in dependence upon a frequency of the AC power signal. An output is coupled to the network and transmits the packetized data and the count value to a client device, which controls a clock associated with the client device in dependence upon the count value.

In accordance with another aspect of the present invention, a client device receives packetized data and a first count value over a network. The device includes an input coupled to the network for receiving the packetized data and the first count value. An AC clock recovery unit receives an AC power signal and generates a second count value in dependence upon a frequency of the AC power signal. A clock associated with the device is controlled in dependence upon a comparison of the first and second count values.

The above-mentioned and other features and advantages of this invention, and the manner of attaining them, will become more apparent and the invention will be better understood by reference to the following description of embodiments of the invention taken in conjunction with the accompanying drawings, wherein.

The exemplifications set out herein illustrate preferred embodiments of the invention, and such exemplifications are not to be construed as limiting the scope of the invention in any manner.

Figure 1:
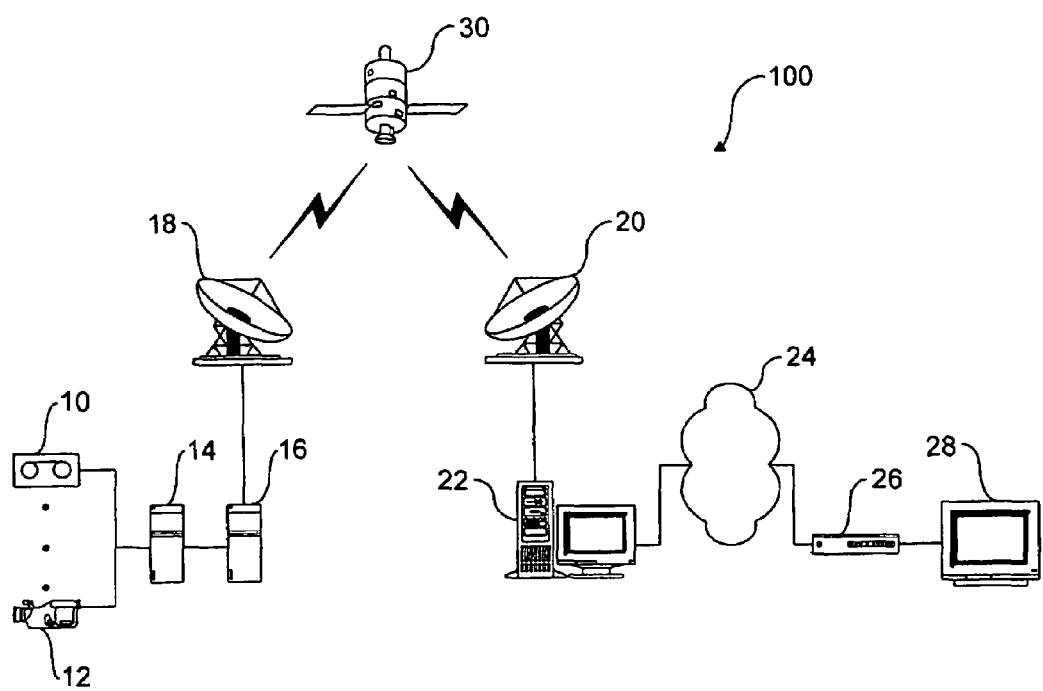
FIG. 1 is an exemplary environment suitable for implementing the present invention.

Referring now to the drawings, and more particularly to FIG. 1, an exemplary environment 100 suitable for implementing the present invention is shown. For purposes of example and explanation, environment 100 of FIG. 1 is shown as a satellite broadcast system. It is noted, however, that the principles of the present invention may be applied to other types of systems, such as terrestrial, cable or other broadcast systems.

As shown in FIG. 1, environment 100 includes a transmission end comprising data sources such as tape source 10 and video source 12, a digitizer/encoder 14, a channel encoder/ modulator 16, and an antenna 18. Environment 100 further includes a receiving end comprising an antenna 20, a network server 22, a network 24, and a client device 26 having an audio/video output device 28 (e.g., television). A satellite 30 transmits signals between the transmission end and the receiving end.

In operation, data from one of the data sources such as tape source 10 or video source 12 is digitized and encoded via digitizer/encoder 14 to generate encoded digital signals. Channel encoder/modulator 16 receives the encoded digital signals and performs thereon operations such as channel encoding, modulation and timing data insertion to generate channel encoded, modulated signals. Antenna 18 receives the channel encoded, modulated signals and transmits the same to satellite 30 as uplink signals. Satellite 30 receives the uplink signals and re-transmits them as downlink signals to antenna 20.

Network server 22, which operates as a gateway device for the receiving end, receives the downlink signals from antenna 20 and performs thereon operations such as channel decoding, demodulation and timing data recovery to generate channel decoded, demodulated signals for distribution over network 24. Network 24 may be embodied as an asynchronous network such as an Ethernet network (e.g., 10BASE-T, 100BASE-X, etc.), a home phone network alliance ("HPNA") network, a power line carrier ("PLC") network, a wireless network (e.g., IEEE 802.11b), or other network. Alternatively, network 24 may be embodied as a synchronous network such as an IEEE 1394 network.

Client device 26 receives the channel decoded, demodulated signals from over network 24, and performs thereon operations such as decoding and timing data recovery to generate, for example, an audio and/or video output via audio/video output device 28. For purposes of example and explanation, FIG. 1 shows only one client device connected to network 24. In practice, however, many such client devices may be connected to network 24.

As previously indicated herein, signal transmission over networks such as network 24 may introduce jitter into the clocks of client devices such as client device 26, thereby causing adverse affects such as video freezing, audio chirps and/or undesirable display color changes. As will be explained herein, the present invention utilizes an AC power source, such as one available in the home, to synchronize clocks for video and/or audio decoding, thereby helping minimize network jitter.

Figure 2:
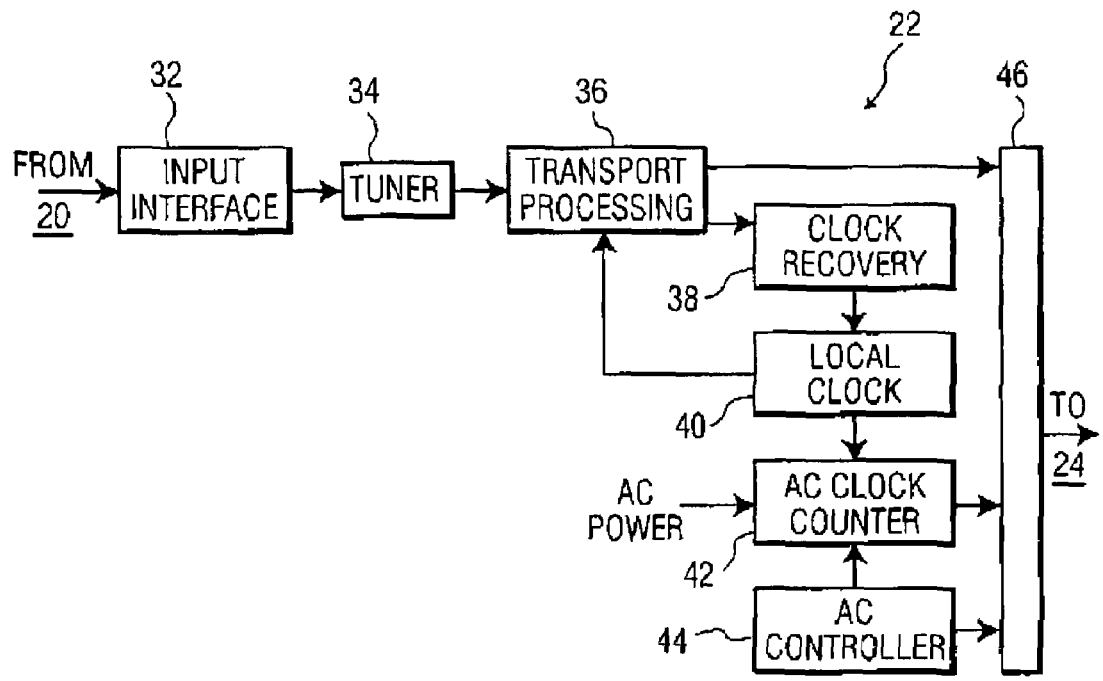
FIG. 2 is a relevant portion of an exemplary network server apparatus according to principles of the present invention.

Referring now to FIG. 2, a relevant portion of network server 22 of FIG. 1 is shown. As shown in FIG. 2, network server 22 includes an input interface 32, a tuner 34, a transport processing unit 36, a clock recovery unit 38, a local clock 40, an AC clock counter 42, an AC controller 44 and a network interface 46.

In operation, input interface 32 receives downlink signals from antenna 20. The received downlink signals include data such as audio and/or video data, and timing data such as System Clock Recovery ("SCR") information that is used by network server 22 to frequency lock its local clock 40 to a reference clock at the transmission end. The signals received by input interface 32 may be in the form of transport packets. Although FIG. 2 shows input interface 32 as receiving signals from only one source (i.e., antenna 20), interface 32 may be configured to receive signals from a plurality of sources, such as satellite, cable, and/or other sources.

Tuner 34 receives the downlink signals from input interface 32 and performs a tuning operation thereon to generate output signals. Transport processing unit 36 receives the output signals from tuner 34 and performs a processing operation thereon which, among other things, separates the SCR information from the data signals. The data signals are provided to network interface 46 and ultimately transmitted as packetized data to client device 26 over network 24, and the SCR information is provided to clock recovery unit 38. Clock recovery unit 38 uses the SCR information to generate control signals that are used to control the frequency of a VCO (not shown) of local clock 40. In this manner, the SCR information is used by network server 22 to frequency lock local clock 40 to a reference clock at the transmission end, which according to an exemplary embodiment exhibits a frequency of approximately 27 MHz. As indicated in FIG. 2, a clock signal from local clock 40 is provided as timing information to transport processing unit 36.

AC clock counter 42 receives (i) the clock signal from local clock 40, (ii) an AC power signal from a source such as a household wall jack, and (iii) a noise duration signal from AC controller 44. Based on these inputs, AC clock counter 42 generates an AC count value that is used to provide synchronization at client device 26 and thereby prevent the introduction of network jitter.

Figure 3:
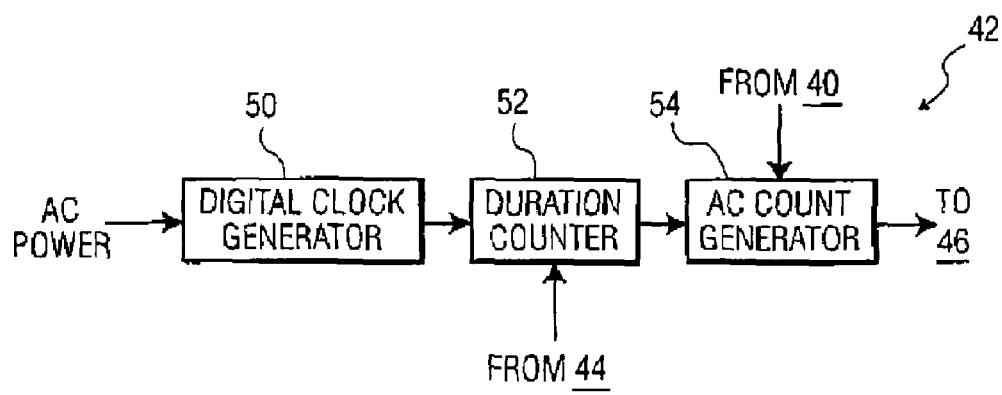
FIG. 3 is an exemplary AC clock counter suitable for use with the network server apparatus of FIG. 2.

Referring now to FIG. 3, further details regarding AC clock counter 42 of FIG. 2 are shown. In particular, AC clock counter 42 includes a digital clock generator 50, a duration counter 52, and an AC count generator 54. As indicated in FIG. 3, digital clock generator 50 receives the AC power signal. Duration counter 52 receives outputs from digital clock generator 50 and the noise duration signal from AC controller 44. AC count generator 54 receives outputs from duration counter 52 and the clock signal from local clock 40. Outputs from AC count generator 54 are provided to network interface 46.

In operation, digital clock generator 50 receives the AC power signal, and generates digital count values in dependence thereon. According to an exemplary embodiment, the AC power signal is a 60 Hz signal provided from a source such as a household wall jack and associated power line. It is recognized, however, that the AC power signal may exhibit a different frequency depending, for example, on geographical location (e.g., 50 Hz is used in Europe). Digital clock generator 50 is preferably embodied as a zero crossing circuit and buffer. Accordingly, digital clock generator 50 generates and buffers the digital count values as the received AC power signal oscillates relative to a zero crossing reference point. In the case of a sinusoidal AC power signal, the zero crossing reference point may, for example, be selected as the x-axis. In this manner, the digital count values generated by digital clock generator 50 represent a clock that is based on the frequency of the AC power signal.

Duration counter 52 receives the digital count values generated by digital clock generator 50, and further receives the noise duration signal from AC controller 44 (see FIG. 2). The digital count values function as a clock input and enable duration counter 52 to count at a frequency corresponding to the frequency of the AC power signal. The noise duration signal represents a time duration over which the AC power signal is preferably observed to compensate for signal irregularities on the power line. That is, AC power signals provided via a household wall jack and associated power line often include noise spikes and other irregular characteristics that can render the signals ineffective for purposes of establishing a time base, if viewed over a relatively short time period. Accordingly, the noise duration signal represents a time duration over which the received AC power signals, viewed as a whole, are considered stable and reliable for purposes of establishing a time base. According to an exemplary embodiment, the time duration represented by the noise duration signal is in the range of 5 to 10 minutes. Duration counter 52 uses the digital count values and the noise duration signal to generate and output a duration pulse. In particular, the duration pulse is a signal having a pulse width corresponding to the time duration represented by the noise duration signal.

AC count generator 54 receives the duration pulse from duration counter 52, and further receives the clock signal from local clock 40 (see FIG. 2). Based on these inputs, AC count generator 54 generates the AC count value for network server 22. More specifically, AC count generator 54 generates the AC count value by performing a counting operation (i) at a frequency corresponding to the clock signal of local clock 40, and (ii) for a duration corresponding to the duration pulse. Put another way, AC count generator 54 counts at the clock frequency of local clock 40 for a time period corresponding to the duration pulse, thereby generating the AC count value. For example, assuming the clock frequency of local clock 40 is 27 MHz, and the time period corresponding to the duration pulse is 8 minutes, the AC count value would be $1.296 \times 10^{10}$ (i.e., $(27 \times 10^6/\text{second}) \times (8 \text{ minutes}) \times (60 \text{ seconds/minute}))$. This process of generating an AC count value is repeatedly performed, thus producing a new AC count value each time a time period corresponding to the duration pulse elapses. In this manner, AC count values are sequentially generated and provided to network interface 46 for transmission to client device 26 over network 24 (see FIGS. 1 and 2). As will be explained further later herein, the AC count values are used to provide synchronization at client device 26, and thereby prevent the introduction of network jitter.

Figure 4:
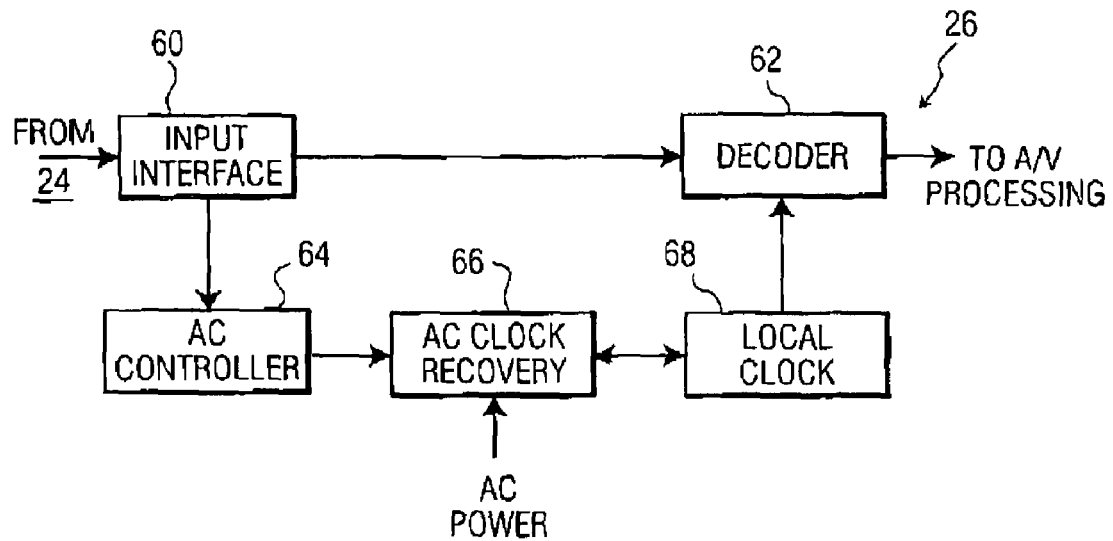
FIG. 4 is a relevant portion of an exemplary client device according to principles of the present invention.

Referring now to FIG. 4, a relevant portion of client device 26 of FIG. 1 is shown. As shown in FIG. 4, client device 26 includes an input interface 60, a decoder 62, an AC controller 64, an AC clock recovery unit 66, and a local clock 68. As will be explained hereinafter, client device 26 receives and operates upon data provided from network server 22 via network 24 to generate, for example, an audio and/or video output via audio/video output device 28.

In operation, input interface 60 receives from network server 22 via network 24 packetized data including audio and/or video data, and timing data including the noise duration signal and the current AC count value. According to an exemplary embodiment, the audio and/or video data, and the timing data may be included together within individual data packets. However, according to another embodiment, the timing data may be included in data packets that are independent of the audio and/or video data packets. Decoder 62 receives the audio and/or video data from input interface 60, and performs a decoding operation thereon to generate decoded signals. Decoder 62 performs these operations in accordance with a clock signal from local clock 68 which, according to an exemplary embodiment, exhibits a frequency of approximately 27 MHz. The decoded signals generated by decoder 62 are provided for further processing, and ultimately, output via audio/video output device 28 (see FIG. 1).

AC controller 64 receives from input interface 60 the timing data including the noise duration signal and the current AC count value provided from network server 22. AC clock recovery unit 66 receives (i) the noise duration signal and the current AC count value from AC controller 64, (ii) an AC power signal from a source such as a household wall jack, and (iii) the clock signal from local clock 68. Based on these inputs, AC clock recovery unit 66 generates yet another AC count value, and compares this AC count value with the AC count value provided by AC controller 64 to enable synchronization at client device 26, thereby preventing the introduction of network jitter.

Figure 5:
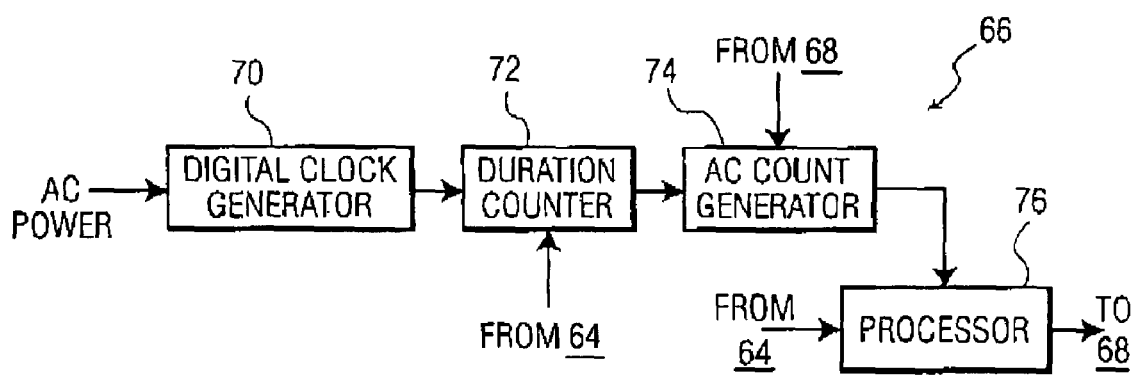
FIG. 5 is an exemplary AC clock recovery unit suitable for use with the client device of FIG. 4.

Referring now to FIG. 5, further details regarding AC clock recovery unit 66 of FIG. 4 are shown. In particular, AC clock recovery unit 66 includes a digital clock generator 70, a duration counter 72, an AC count generator 74, and a processor 76. As indicated in FIG. 5, digital clock generator 70 receives the AC power signal. Duration counter 72 receives outputs from digital clock generator 70 and the noise duration signal from AC controller 64. AC count generator 74 receives outputs from duration counter 72 and the clock signal from local clock 68. Processor 76 receives outputs from AC count generator 74 and the AC count value from AC controller 64. Outputs from processor 76 are provided to local clock 68. As will become evident from the following description, AC clock recovery unit 66 of FIG. 5 is similar in construction and operation to AC clock counter 42 of FIG. 3.

In operation, digital clock generator 70 receives the AC power signal, and generates digital count values in dependence thereon. According to an exemplary embodiment, the AC power signal is a 60 Hz signal provided from a source such as a household wall jack and associated power line. Of course, the AC power signal may exhibit a different frequency depending, for example, on geographical location. Like digital clock generator 50 of FIG. 3, digital clock generator 70 is preferably embodied as a zero crossing circuit and buffer. Accordingly, digital clock generator 70 generates and buffers the digital count values as the received AC power signal oscillates relative to a zero crossing reference point. In the case of a sinusoidal AC power signal, the zero crossing reference point may, for example, be selected as the x-axis. In this manner, the digital count values generated by digital clock generator 70 represent a clock that is based on the frequency of the AC power signal.

Duration counter 72 receives the digital count values generated by digital clock generator 70, and further receives the noise duration signal from AC controller 64. The digital count values function as a clock input and enable duration counter 72 to count at a frequency corresponding to the frequency of the AC power signal. This noise duration signal is the same noise duration signal used by duration counter 52 of FIG. 3, and accordingly represents the time duration over which the AC power signal is preferably observed to compensate for signal irregularities on the power line. Duration counter 72 uses the digital count values and the noise duration signal to generate and output a duration pulse. As previously indicated herein, the duration pulse is a signal having a pulse width corresponding to the time duration represented by the noise duration signal.

AC count generator 74 receives the duration pulse from duration counter 72, and further receives the clock signal from local clock 68 (see FIG. 4). Based on these inputs, AC count generator 74 generates an AC count value for client device 26 in the same manner as AC count generator 54 of FIG. 3 generated the AC count value for network server 22. That is, AC count generator 74 generates the AC count value for client device 26 by performing a counting operation (i) at a frequency corresponding to the clock signal of local clock 68, and (ii) for a duration corresponding to the duration pulse. Like AC count generator 54 of FIG. 3, AC count generator 74 of FIG. 5 generates AC count values in a repeated manner, thus producing a new AC count value each time a time period corresponding to the duration pulse elapses.

Processor 76 receives (i) the AC count value for client device 26 from AC count generator 74, and (ii) the AC count value for network server 22 from AC controller 64, and compares the two AC count values. Based on this comparison, processor 76 generates and outputs a control signal that drives a VCO (not shown) of local clock 68, thereby adjusting its output frequency. In this manner, processor 76 continues to adjust the VCO of local clock 68 until the AC count value for client device 26 is equal to the AC count value for network server 22. Once these two AC count values are equal, local clocks 40 and 68 of network server 22 and client device 26 are synchronized, and network jitter is prevented.

As described herein, the present invention advantageously provides a scheme for achieving synchronization within a network, and thereby prevents the introduction of network jitter. While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within is the limits of the appended claims.

The invention claimed is:

1. An apparatus for receiving packetized data and transmitting the packetized data over a network, the apparatus comprising:
   an input for receiving the packetized data from a signal source;
   an AC clock counter for receiving an AC power signal and generating a count value in dependence upon a frequency of the AC power signal and a noise duration signal, the noise duration signal representing a time duration over which the AC power signal is to be observed; and
   an output coupled to the network for transmitting the packetized data and the count value to a client device, thereby allowing the client device to control a clock associated with the client device in dependence upon the count value.

2. The apparatus of claim 1, wherein the AC clock counter comprises:
   a digital clock generator for generating a digital clock in dependence upon the frequency of the AC power signal;
   a duration counter for generating a duration pulse in dependence upon the digital clock and the noise duration signal; and
   an AC count generator for generating the count value in dependence upon the duration pulse.

3. The apparatus of claim 1, wherein the network is an Ethernet network.

4. The apparatus of claim 1, wherein the network is an HPNA network.

5. The apparatus of claim 1, wherein the network is a PLC network.

6. The apparatus of claim 1, wherein the network is a wireless network.

7. A method for receiving packetized data and transmitting the packetized data over a network, the method comprising:
   receiving the packetized data from a signal source;
   receiving an AC power signal and generating a count value in dependence upon a frequency of the AC power signal and a noise duration signal, the noise duration signal representing a time duration over which the AC power signal is to be observed; and
   transmitting the packetized data and the count value to a client device, thereby allowing the client device to control a clock associated with the client device in dependence upon the count value.

8. The method of claim 7, wherein the count value is generated by steps comprising:
   generating a digital clock in dependence upon the frequency of the AC power signal;
   generating a duration pulse in dependence upon the digital clock and the noise duration signal; and
   generating the count value in dependence upon the duration pulse.

9. A device coupled to a network, the device comprising:
   an input, coupled to the network, for receiving packetized data, a first count value and a noise duration signal from a remote apparatus;
   a clock; and
   an AC clock recovery unit for receiving an AC power signal and generating a second count value in dependence upon a frequency of the AC power signal and the noise duration signal, the noise duration signal representing a time duration over which the AC power signal is to be observed, wherein the clock is controlled in dependence upon a comparison of the first and second count values.

10. The device of claim 9, wherein the AC clock recovery unit comprises:
    a digital clock generator for generating a digital clock in dependence upon the frequency of the AC power signal;
    a duration counter for generating a duration pulse in dependence upon the digital clock and the noise duration signal; and
    an AC count generator for generating the second count value in dependence upon the duration pulse.

11. The device of claim 10, wherein the AC clock recovery unit further comprises a processor for comparing the first and second count values, and controlling the clock in dependence upon the comparison.

12. The device of claim 9, wherein the network is an Ethernet network.

13. The device of claim 9, wherein the network is an HPNA network.

14. The device of claim 9, wherein the network is a PLC network.

15. The device of claim 9, wherein the network is a wireless network.

16. A method for receiving packetized data over a network, the method comprising:
    receiving the packetized data, a first count value and a noise duration signal from the network;
    receiving an AC power signal and generating a second count value in dependence upon a frequency of the AC power signal and the noise duration signal, the noise duration signal representing a time duration over which the AC power signal is to be observed;
    comparing the first and second count values; and
    controlling a clock in dependence upon the comparison.

17. The method of claim 16, wherein the second count value is generated by steps comprising:
    generating a digital clock in dependence upon the frequency of the AC power signal;
    generating a duration pulse in dependence upon the digital clock and the noise duration signal; and
    generating the second count value in dependence upon the duration pulse.

* * * * *